United States Patent

[11] 3,563,257

[72] Inventor Phil F. Cummins
 Fort Worth, Tex.
[21] Appl. No. 768,987
[22] Filed Oct. 21, 1968
[45] Patented Feb. 16, 1971
[73] Assignee Stromberg-Carlson Corporation
 Rochester, N.Y.

[54] COLLAPSIBLE AND PORTABLE AIRCRAFT NOSE DOCK
 1 Claim, 5 Drawing Figs.
[52] U.S. Cl................................................. 135/4,
 52/63, 52/71
[51] Int. Cl............................................... E04b 1/347
[50] Field of Search........................................ 135/1, 4, 4
 (A), 7, 7 (A); 52/1, 43, 71, 64, 63

[56] References Cited
 UNITED STATES PATENTS
2,627,865 2/1953 Mitchell et al............... 135/4
2,689,579 9/1954 Sartori......................... 135/4
2,778,369 1/1957 Tang............................ 135/1
2,806,477 9/1957 Fritsche....................... 135/4
2,960,993 11/1960 Holmstrom.................. 135/4

Primary Examiner—J. Karl Bell
Attorney—Hoffman Stone

ABSTRACT: A collapsible and portable shelter for the nose of an aircraft including a toroidal section supported on U-shaped bows, the outer ends of which are pivoted for an erecting and collapsing action basically similar to the action of a perambulator hood. The legs of the bows are hinged near the bight portions of the bows so they can be folded inwardly when the structure is collapsed to form a compact bundle. The bow at one end of the structure is mounted on casters for easy maneuverability when the structure is collapsed. Straight vertical sections may be secured to the toroidal section to extend the dock to any desired length.

INVENTOR.
PHIL F. CUMMINS

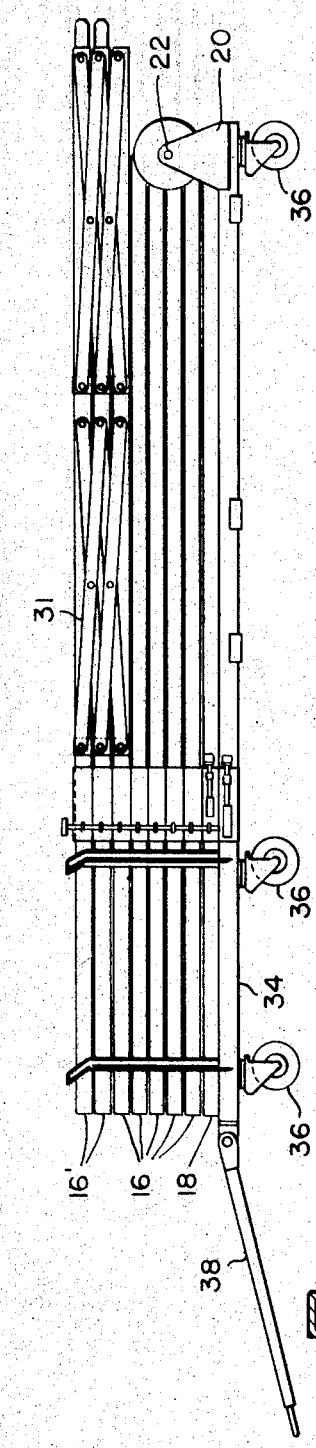
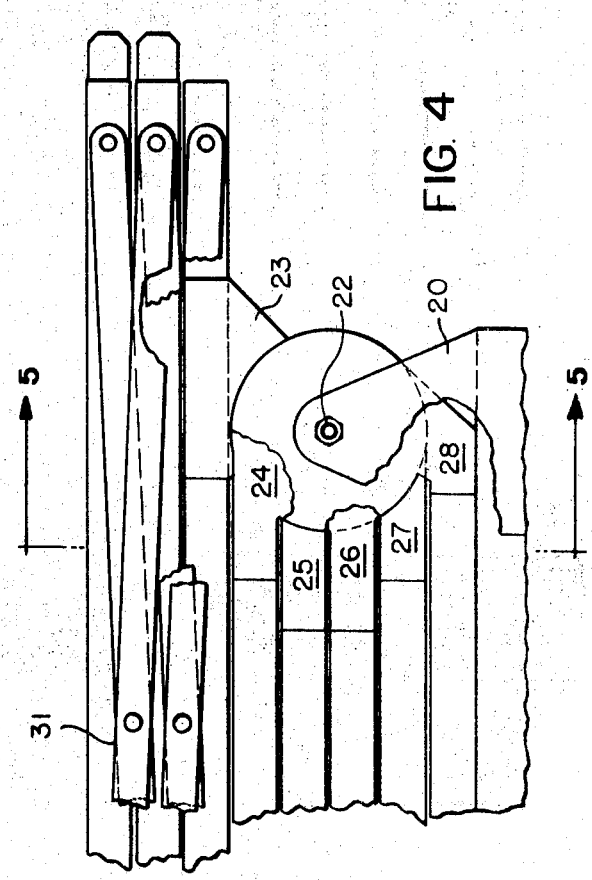
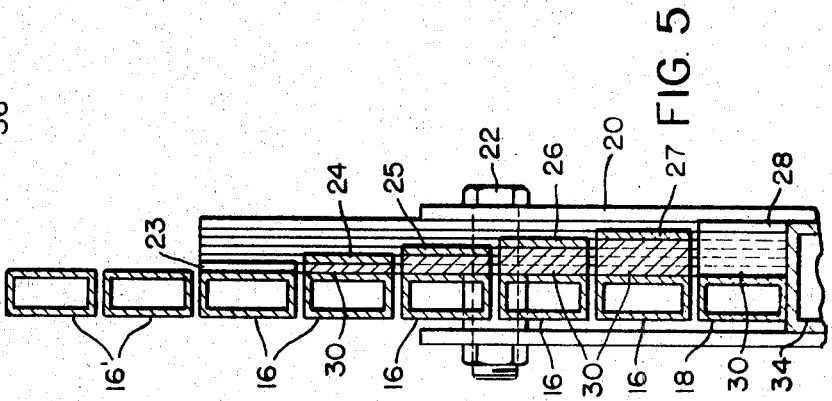
FIG. 2
FIG. 4
FIG. 5
INVENTOR.
PHIL F. CUMMINS

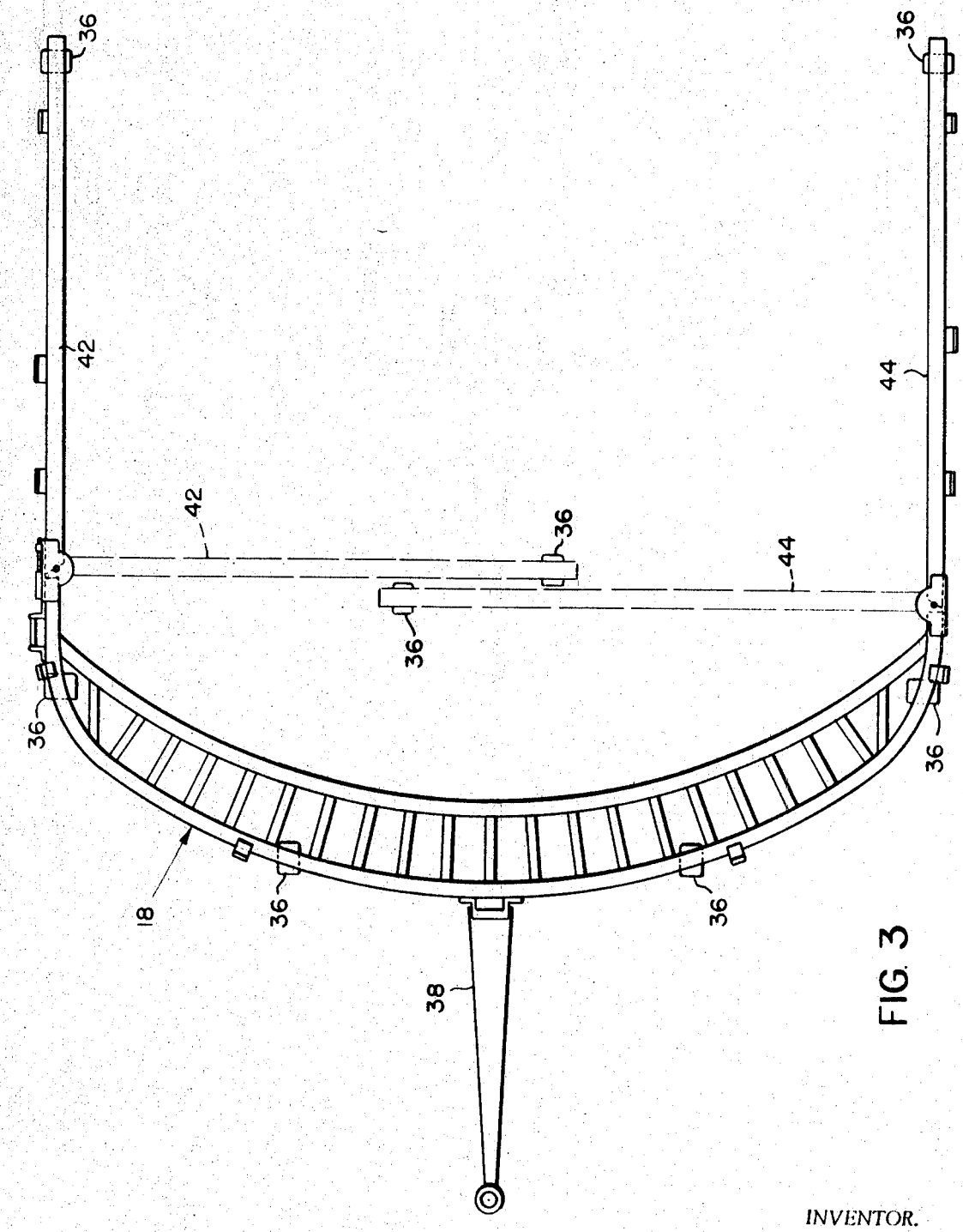

COLLAPSIBLE AND PORTABLE AIRCRAFT NOSE DOCK

BRIEF SUMMARY

This invention relates to a novel collapsible shelter of the type particularly suited for use as a portable aircraft nose dock.

Modern aircraft of all types are commonly fitted with radar equipment mounted in the nose, which equipment requires relatively frequent inspection and service. To avoid tying up hanger space, it is desirable to provide a portable shelter which can be trundled out to the aircraft needing radar service and quickly erected over the nose portion of the aircraft to afford protection both to the mechanics and to the equipment against inclement weather.

Accordingly, the principal object of the invention is to provide a novel portable nose dock especially intended for aircraft maintenance, which is of relatively inexpensive, yet sturdy and long lasting construction, easily transportable, requires minimum storage space when collapsed, and can be erected and collapsed quickly and easily.

Briefly, in accordance with the invention, an aircraft nose dock comprises a collapsible, toroidal section supported by plural, generally U-shaped bows, the ends of which are pivoted about a common center for a fanlike folding and unfolding action like the bows of the common perambulator hood. In addition, the legs of the bows are hinged near the bight portions so they can be folded inwardly across the bight portions when the structure is collapsed to reduce it to a very compact bundle. Casters are mounted on the bow at one end of the structure so that it may be towed readily from place to place. The bow upon which the casters are mounted remains always in a horizontal position, and provides a base for the structure. When the dock is collapsed, it folds down upon the horizontal bow, in contrast to previous collapsible toroidal shelters, which have generally been arranged to be pulled into a vertical position when collapsed, with the toroidal section functioning as a door.

DETAILED DESCRIPTION

A presently preferred embodiment of the invention will now be described in detail in connection with the accompanying drawings, wherein:

FIG. 2 is a side elevation view of the frame of the nose dock in its collapsed position with the legs extended;

FIG. 3 is a plan view of the nose dock frame as shown in FIG. 2;

FIG. 4 is a side elevational view, on an enlarged scale, of the pivot assembly at one side of the dock for the bows of the toroidal section; and FIG. 5 is a cross-sectional view taken along the line 5–5 of FIG. 4.

Figure 1:
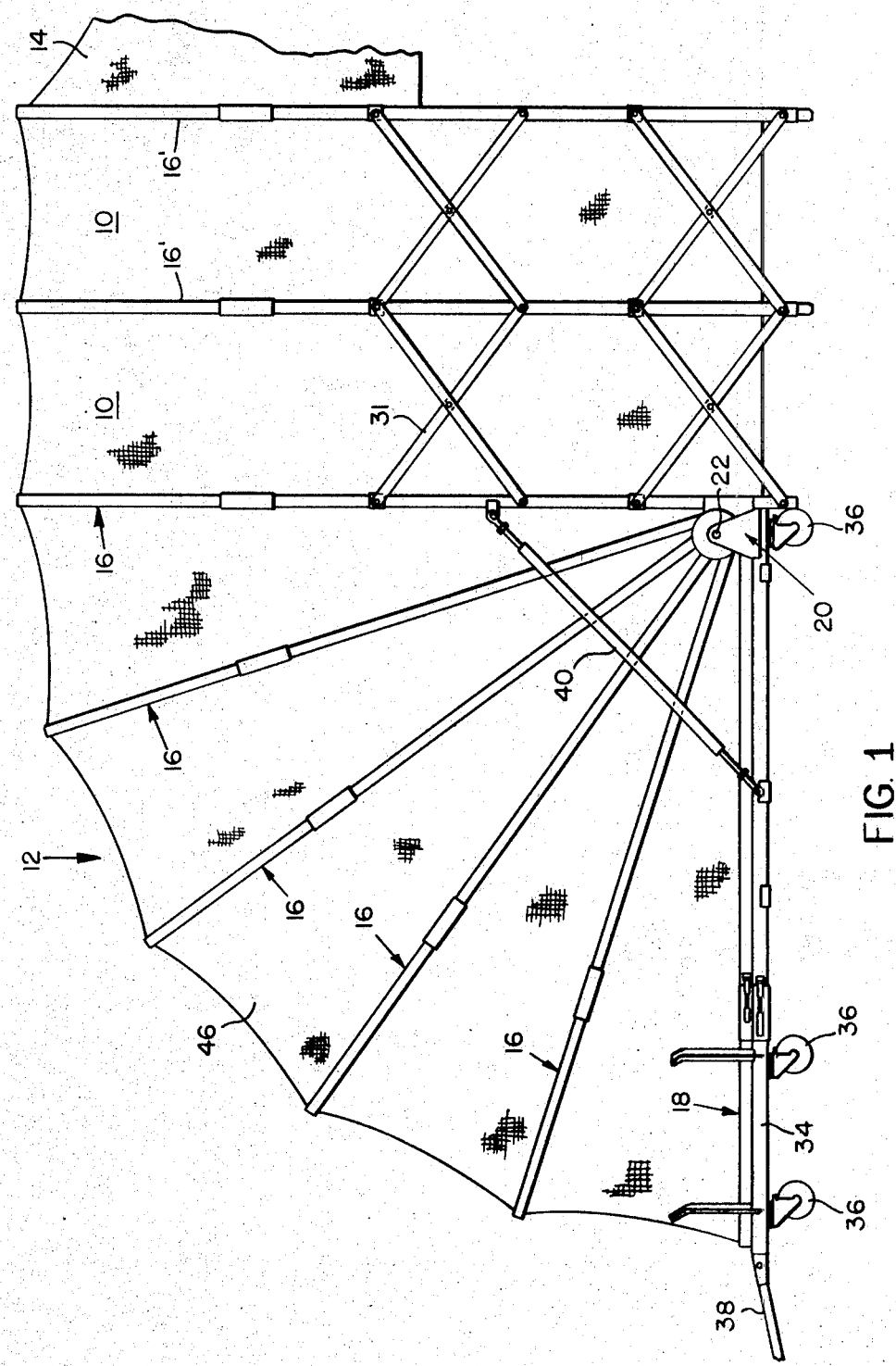
FIG. 1 is a side elevational view of a nose dock according to the presently preferred embodiment of the invention, showing the nose dock in its erected position.

As shown, the nose dock according to the presently preferred embodiment of the invention includes any desired number of sections 10 of the portable and collapsible utility structure of the lazy tongs type described and claimed in my previous Patent, No. 3,256,896, issued June 21, 1966. Both ends of this part of the nose dock are open. One end is joined to the toroidal section 12. A drapery 14 of sheet material is preferably attached to the opposite end to extend rearwardly on and partly around the aircraft when the dock is in service to maximize weather shielding. In drastic climates such as, for example, at Antarctica, the drapery 14 may be extended and modified to provide any desired degree of sealing to the aircraft. Ordinarily, under conditions normally encountered in the continental United States and with presently available portable heating devices of high capacity, the simple canopy form of the drapery 14 illustrated is fully adequate.

Since the construction of the straight sections 10 is identical to that shown in my hereinabove identified patent, it need not be described herein, and the patent may be referred to for a detailed description of it.

The toroidal section 12, which will be referred to herein as at the rear of the nose dock, includes a rigid, collapsible framework made up of bows 16 and 18 generally similar to the bows 16' of the straight section 10. The end bow 18 is rigidly secured to pivot brackets 20 upon which the ends of all the other bows 16 are pivoted for rotation about a common axis 22. To facilitate manufacture, the bows 16 and 18 are all of identical construction, and, because when the dock is in its collapsed position, the bows are stacked one upon the other, special provision is made to allow them to pivot about the common axis 22 without interference. The legs of the bows 16 are rigidly secured at their outer ends to separate respective plates 24, 25, 26, 27, and 28, all of which are mounted upon the pivot bracket 20 for rotation about the common axis 22. Spacer blocks 30 of respectively different thicknesses are provided between the mounting plates 24—28 and the respective bows 16 to compensate for the spacings of the plates 24—28 along the pivot axis 22, thereby to keep the legs of the bows in alignment with each other. The straight section 10 of the dock is secured by the lazy tongs 31 to the end bow 16 opposite from the normally horizontal fixed bow 18 of the toroidal section.

As shown, the permanently horizontal bow 18 rests upon and is firmly fixed to a special auxiliary bow 34, which is generally similar to the bows 16 and 18, except that it is stronger, being made of heavier gauge metal, and being of larger cross sectional dimensions, because it acts as a base support for the entire nose dock when the nose dock is collapsed. The pivot brackets 20 are fixed upon the special bow 34, and casters 36 are mounted beneath the special bow 34 to enable the dock to be towed from place to place without the necessity of lifting it onto a separate carrier. Provision is made for attaching a tow bar 38 to the special bow 34 selectively at any of two or more desired points for easy maneuvering.

As shown, removable braces 40 extend between the special bow 34 and the end one of the bows 16 for holding the toroidal section in its erected position. If desired, any of various different kinds of folding braces may be used in place of the simple removable braces shown.

In operation, the nose dock in its collapsed and folded position may be readily pushed or towed to the desired point of use. The leg portions 42 and 44 of the bows (FIG. 3) are then unfolded and latched in their unfolded position as described in my hereinabove identified patent. The toroidal section is extended, either manually, or, preferably, with the aid of lightweight jacks, and locked by insertion of the braces 40. The straight section 10 is then extended, and the drapery 14 secured to the aircraft. The reverse procedure is undertaken when it is desired to collapse the structure. The sheet material 46 may be attached to the bows 16 and 18 by any desired means in accordance with the designer's choice. It is, of course, secured along the inner edges of the bows so that it does not pleat between the bows when the shelter is collapsed.

I claim:

1. An aircraft nose dock comprising plural rigid bows of substantially identical construction, the legs of said bows being hinged to permit them to be folded inwardly towards each other and across the bight portions of said bows, means pivoting the ends of the legs of said bows about a common axis when said legs are straight and unfolded, said pivot means being arranged so that when said bows are pivoted towards each other they lie in flat stacked noninterfering registered array, a base bow generally similar to the aforesaid bows and mounting said pivot means, casters mounted on said base bow to support it movably upon a surface such as the ground or a roadway, and an extendable section secured to the one of said bows farthest from said base bow and extendable therefrom when said bows are extended to form a tunnellike extension joined to the toroidal section formed by said bows, said extendable section also including supporting bows identical to the first said bows so that the entire structure may be collapsed in stacked array upon said base bow.